United States Patent

Yokoyama et al.

[11] Patent Number: 5,757,775
[45] Date of Patent: May 26, 1998

[54] INTERFACE FOR DETECTING LOSS OF CALL SETUP ATM CELL TO PREVENT MISROUTING IN DESTINATION LOCAL NETWORK

[75] Inventors: Masaru Yokoyama; Hajime Kawamura, both of Tokyo, Japan

[73] Assignee: NEC Corporation, Tokyo, Japan

[21] Appl. No.: 665,097

[22] Filed: Jun. 14, 1996

[30] Foreign Application Priority Data

Jun. 14, 1995 [JP] Japan ................................. 7-146644

[51] Int. Cl.⁶ .................................................. H04J 3/14
[52] U.S. Cl. ........................ 370/242; 370/474; 370/395
[58] Field of Search ................................. 370/242, 243,
370/244, 245, 250, 252, 241, 229, 230,
235, 216, 392, 394, 395, 396, 397, 398,
399, 410, 419, 420, 421, 422, 428, 463,
465, 471, 472, 473, 474, 475, 476, 522,
528, 525, 529, 389, 401, 402, 403, 404,
405, 246, 247, 469, 467; 340/825.06, 825.16,
825.17; 379/63

[56] References Cited

U.S. PATENT DOCUMENTS 5,086,507  2/1992  Mela ........................................ 379/63
5,101,403  3/1992  Balzano ................................ 370/242
5,459,722 10/1995  Sherif ................................... 370/474
5,461,607 10/1995  Miyagi et al. ...................... 370/244
5,553,057  9/1996  Nakayama ......................... 370/241

*Primary Examiner*—Wellington Chin
*Assistant Examiner*—Huy D. Vu
*Attorney, Agent, or Firm*—Sughrue, Mion, Zinn, Macpeak and Seas.

[57] ABSTRACT

An interface between an ATM network and a local network includes a cell disassembler for disassembling ATM cells from the ATM network and transmitting a disassembled signal to the local network. A cell assembler assembles a signal from the local network into ATM cells and transmitting the ATM cells to the ATM network. A cell loss detector is provided for detecting a loss of a cell in a series of ATM cells from the ATM network. A signaling cell detector detects a call setup ATM cell from the ATM network. A coincidence gate produces an output when there is a coincidence between the detection of the cell loss and the detection of the call setup ATM cell. When the coincidence is detected, a busy tone is supplied to the cell assembler, where it is assembled into ATM cells and transmitted to the ATM network.

6 Claims, 1 Drawing Sheet

INTERFACE FOR DETECTING LOSS OF CALL SETUP ATM CELL TO PREVENT MISROUTING IN DESTINATION LOCAL NETWORK

BACKGROUND OF THE INVENTION

1. Field of the Invention

The present invention relates generally to asynchronous transfer mode (ATM) networks, and more specifically to an interface between an ATM network and a local network.

2. Description of the Related Art

In an ATM network, cells are transmitted transparently from one node to the next. Due to the statistical multiplexing of the ATM switches, buffers are provided in each node to accommodate variation of traffic load. Cells are discarded when their traffic exceeds the capacity of a particular buffer. Cells are also discarded when an irrecoverable bit error occurs in the cell header. Since the ATM network is connection-oriented, signaling cells are used to establish and clear connections in the ATM network. If the connection is to be established between users of distant local networks using individual channel signaling (as opposed to common channel signaling), signaling ATM cells are transmitted beyond the periphery of the ATM network out to the destination network. If there is a loss of a call setup cell in the ATM network, the latter receives an idle cell, instead of the lost cell, and establishes a wrong connection. The local network may be a private branch exchange or a local device capable of routing an incoming call.

SUMMARY OF THE INVENTION

It is therefore an object of the present invention to provide an ATM interface capable of protecting from the loss of a call setup ATM cell.

According to the present invention, there is provided an interface between an asynchronous transfer mode (ATM) network and a local network. The interface comprises a cell loss detector for detecting a cell loss in a series of ATM cells from the ATM network, a signaling cell detector for detecting a call setup ATM cell from the ATM network, and a coincidence gate for detecting a coincidence between the detection of a cell loss by the cell loss detector and the detection of a call setup ATM cell by the signaling cell detector. When the coincidence is detected, an audible tone is assembled into ATM cells and transmitted to the ATM network.

Preferably, the interface comprises a cell disassembler for disassembling ATM cells from the ATM network and transmitting a disassembled signal to the local network and a cell assembler for assembling a signal from the local network into ATM cells and transmitting the ATM cells to the ATM network. In addition, the audible tone is preferably a busy tone since the busy tone can be easily recognized by the calling user terminal as a failure in establishing a connection.

DESCRIPTION OF THE DRAWINGS

The present invention will be described in further detail with reference to the accompanying drawings, in which.

DETAILED DESCRIPTION

Figure 1:
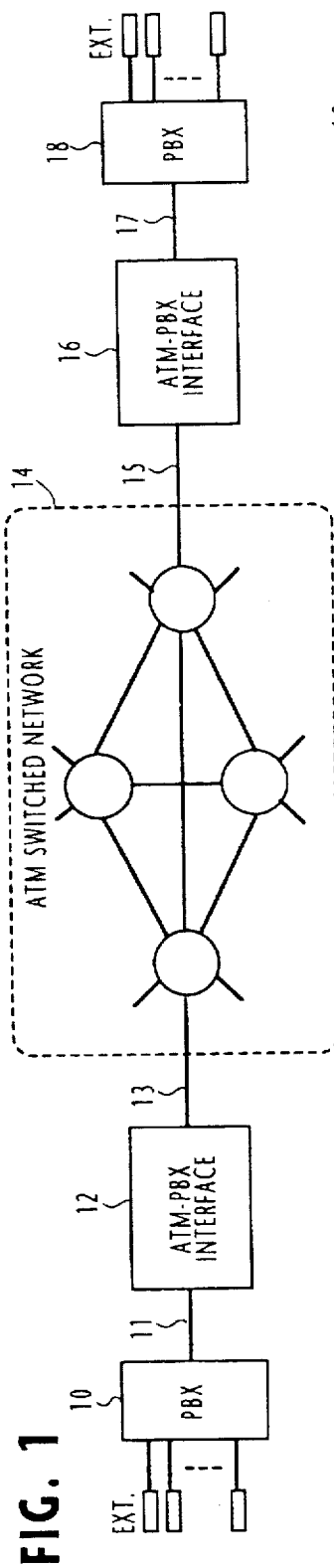
FIG. 1 is a simplified block diagram of an inter-PBX transmission system according to the present invention using ATM-PBX interfaces.

FIG. 1 shows a simplified form of the inter-PBX (private branch exchange) communication system of the present invention using an ATM (asynchronous transfer mode) switched network. The system is shown to include two PBX's 10 and 18 which serve extension stations such as telephones, fax machines and user data terminals. Each of these PBX's uses the individual channel signaling scheme where speech signals and signaling messages are carried over the same channel, as opposed to the common channel signaling scheme where an independent network is provided for exclusively carrying signaling messages. The PBX 10 is connected via a link 11 to an ATM-PBX interface 12 which is connected via a link 13 to an ATM node of the ATM switched network 14. The other PBX 18 is similarly connected to an ATM node of the network via a link 17, an ATM-PBX interface 16 and a link 15. The PBX's 10 and 18 send their analog speech signals and outband signaling messages over separate two-way transmission paths of the links 11 and 17 to the associated interfaces. The network side of ATM-PBX interface 12 is connected via separate one-way transmission paths (forward and reverse channels) of the link 13 and the network side of ATM-PBX interface 16 is connected via separate one-way transmission paths of link 15 to the network.

Figure 2:
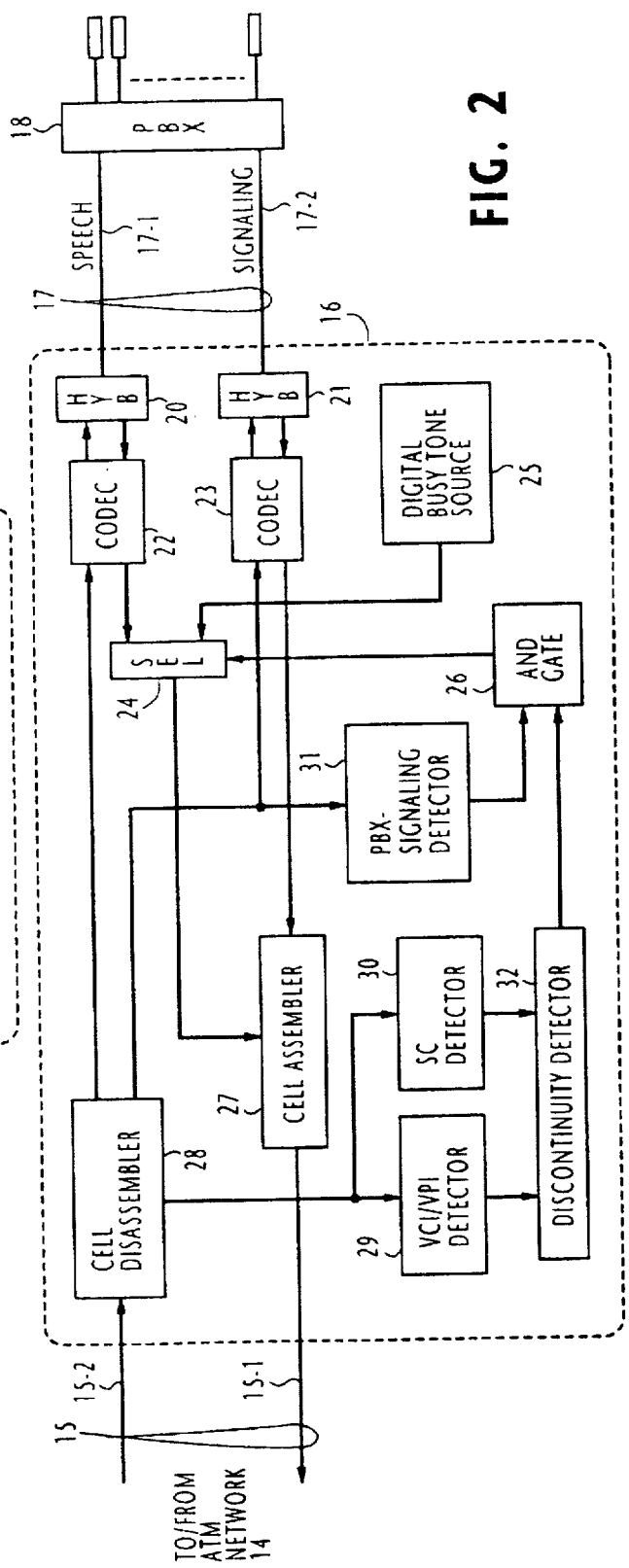
FIG. 2 is a block diagram of the destination-side ATM-PBX interface of FIG. 1.

Details of the ATM-PBX interfaces are shown in FIG. 2. Since these interfaces are identical to each other and the present invention resides at destination as will be understood hereinbelow, only interface 16 is shown by assuming that PBX's 10 and 18 are the source and the destination, respectively.

The destination ATM-PBX interface 16 comprises two wire-four wire converters, or hybrid circuits 20 and 21 whose two-wire sides are connected to the PBX 18 via a two-way speech path 17-1 and a two-way signaling path 17-2, respectively. The analog speech signal at the transmit port of the four-wire side of hybrid 20 is converted to digital form by a codec (coder/decoder) 22 and supplied via a selector 24 to one input of a cell assembler 27 and the analog signaling message at the transmit port of the four-wire side of hybrid 21 converted to digital form by a codec 23 and supplied to the other input of cell assembler 27. A digital busy tone source 25 is connected to the selector 24. Selector 24 is controlled by a switching command signal from a coincidence (AND) gate 26. Normally, selector 24 is coupling the digital speech signal to cell assembler 27. Selector 24 sends a digital busy tone from source 25 to cell assembler 27 when the switching command signal is generated. The digital speech signal and signaling message of PBX 18 are respectively assembled into speech cells and signaling cells of the ATM format by the cell assembler 27 and sent through the transmit path 15-1 of link 15 to the ATM network 14.

The receive path 15-2 of link 15 is connected to the input of a cell disassembler 28. ATM speech and signaling cells from the ATM network are carried on the receive path 15-2 and disassembled by cell disassembler 28 into digit streams. According to their cell type information, the digit streams of the speech and signaling information are separated from each other and respectively converted to analog form by codecs 22 and 23, and applied to the receive port of the four-wire side of hybrid circuits 20 and 21 for transmission through lines 17-1, 17-2 to the destination PBX 18.

A VCI/VPI detector 29 and a serial count detractor 30 are connected to the cell disassembler 28 to receive the 5-octet cell header of a disassembled ATM cell and a 1-octet AAL-1 (ATM Adaptation Layer-1) header of the ATM cell, respectively. In addition, a PBX signaling detector 31 is connected to the signaling output port of disassembler 278 to produce an output signal when it detects a signaling cell for establishing a connection from PBX 10 to PBX 18.

Figure 3:
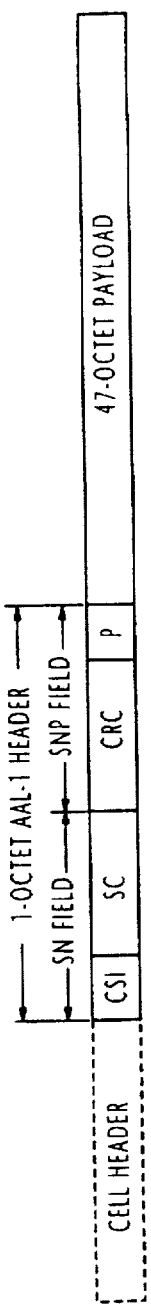
FIG. 3 is an illustration of the format of an ATM cell at the ATM Adaptation Layer-1.

As shown in FIG. 3, the AAL layer of ATM cell format according to the ITU-T Recommendations I-363 and I-365.1 comprises a 5-octet cell header followed by a 48-octet information field. The first 1 octet of the information field is the AAL-1 header which contains a 4-bit serial number (SN) field and a 4-bit serial number protection (SNP) field. The SN field comprises a 1-bit convergence sublayer identifier (CSI) subfield and a 3-bit serial count (SC) subfield, and the SNP field comprises a 3-bit cyclic redundancy check (CRC) code subfield and a 1-bit parity bit (P).

The VCI/VPI detector 29 detects the VCI/VIP (virtual channel identifier/virtual path identifier) field of the cell header supplied from cell disassembler 28 and holds the VCI/VPI value in a memory so that a sequence of VCI/VPI values is stored. The SC detector 30 detects the serial count value in the AAL-1 header associated with the VCI/VPI value detected by detector 29 and holds the SC value in a memory so that a sequence of serial count values is stored. The sequences of VCI/VPI and serial count values are supplied from detectors 29 and 30 to a discontinuity detector 32. Using the VCI/VPI values from detector 29, the discontinuity detector 32 determines whether there is a discontinuity in the sequence of sequence count values of a particular VCI/VPI value.

If cell sequence integrity is maintained in the ATM network 14 for a connection from PBX 10 to PBX 18, there is no loss of cells from the source network node and the sequence count values stored in the SC detector 30 at the destination ATM-PBX interface 16 vary consecutively from 0 to 7 and cyclically repeats the same consecutive values (i.e., a modulo 8). If there is a cell loss in the ATM network 14, there is a discontinuity in the modulo-8 count values for a particular VCI/VPI value in SC detector 30 and the discontinuity detector 32 supplies an output signal to the coincidence gate 24. If a cell loss event is detected at the same time a signaling cell is detected by PBX-signaling detector 31, there is a coincidence at the inputs of the coincidence gate 24. As a result, a switching command signal is produced by coincidence gate 26 and selector 24 is switched to the lower position for coupling the busy tone source 25 to the cell assembler 27.

Therefore, ATM cells carrying a busy tone is transmitted through the network to the source ATM-PBX interface 12. At the source interface 12, these ATM cells are disassembled and converted to a busy tone signal and transmitted to the PBX 10. The user at the call-originating terminal hears a busy tone and reattempts the call setup procedure. If the originating terminal is a fax machine, it responds to the busy tone by automatically reattempting the call setup procedure.

What is claimed is:

1. An interface between an asynchronous transfer mode (ATM) network and a local network, comprising:

a cell loss detector for detecting a cell loss in a series of ATM cells from the ATM network;

a signaling cell detector for detecting a call setup ATM cell from the ATM network;

a coincidence gate for detecting a coincidence between the detection of a cell loss by the cell loss detector and the detection of a call setup ATM cell by the signaling cell detector; and means for assembling an audible tone into ATM cells and transmitting the ATM cells to the ATM network when said coincidence is detected.

2. An interface as claimed in claim 1, wherein said audible tone is a busy tone.

3. An interface as claimed in claim 1, wherein said cell loss detector comprises:

a VCI/VPI (virtual channel identifier/virtual path identifier) detector for detecting VCI/VPI values from ATM cells received from the ATM network;

a sequence count detector for detecting sequence count values from said ATM cells; and a discontinuity detector connected to the VCI/VPI detector and the sequence count detector for detecting a cell loss when there is a discontinuity in the sequence count values detected by the sequence count detector for a particular VPI/VCI value detected by the VCI/VPI detector.

4. An interface between an asynchronous transfer mode (ATM) network and a local network, comprising:

a cell disassembler for disassembling ATM cells from the ATM network and transmitting a disassembled signal to the local network;

a cell assembler for assembling a signal from the local network into ATM cells and transmitting the ATM cells to the ATM network;

a cell loss detector for detecting a cell loss in a series of ATM cells from the ATM network;

a signaling cell detector for detecting a call setup ATM cell from the ATM network;

a coincidence gate for detecting a coincidence between the detection of a cell loss by the cell loss detector and the detection of a call setup ATM cell by the signaling cell detector; and means for supplying an audible tone to the cell assembler when said coincidence is detected.

5. An interface as claimed in claim 4, wherein said audible cone is a busy tone.

6. An interface as claimed in claim 4, wherein said cell loss detector comprises:

a VCI/VPI (virtual channel identifier/virtual path identifier) detector for detecting VCI/VPI values from ATM cells received from the network;

a sequence count detector for detecting sequence count values from said ATM cells; and a discontinuity detector connected to the VCI/VPI detector and the sequence count detector for detecting a cell loss when there is a discontinuity in the sequence count values detected by the sequence count detector for a particular VPI/VCI value detected by the VCI/VPI detector.

* * * * *